(12) United States Patent
Morino et al.

(10) Patent No.: US 8,394,888 B2
(45) Date of Patent: Mar. 12, 2013

(54) AQUEOUS DISPERSION TYPE ACRYLIC PRESSURE-SENSITIVE ADHESIVE COMPOSITION AND PRESSURE-SENSITIVE ADHESIVE TAPE

(75) Inventors: Akinori Morino, Saitama (JP); Naoki Kato, Saitama (JP)

(73) Assignee: DIC Corporation, Tokyo (JP)

( * ) Notice: Subject to any disclaimer, the term of this patent is extended or adjusted under 35 U.S.C. 154(b) by 23 days.

(21) Appl. No.: 12/934,886

(22) PCT Filed: Feb. 23, 2009

(86) PCT No.: PCT/JP2009/053186
§ 371 (c)(1),
(2), (4) Date: Nov. 2, 2010

(87) PCT Pub. No.: WO2009/119220
PCT Pub. Date: Oct. 1, 2009

(65) Prior Publication Data
US 2011/0046296 A1 Feb. 24, 2011

(30) Foreign Application Priority Data

Mar. 28, 2008 (JP) .................. 2008-086285
Nov. 26, 2008 (JP) .................. 2008-300767

(51) Int. Cl.
*C09J 133/00* (2006.01)
*C09J 133/02* (2006.01)
*C09J 133/08* (2006.01)
*C09J 133/10* (2006.01)

(52) U.S. Cl. .................. 524/556; 524/555; 428/355 AC; 428/355 CN

(58) Field of Classification Search .................. 524/457, 524/458, 460, 461, 516, 522
See application file for complete search history.

(56) References Cited

U.S. PATENT DOCUMENTS

| | | | | |
|---|---|---|---|---|
| 5,464,916 A | * | 11/1995 | Young et al. | 526/264 |
| 5,739,196 A | * | 4/1998 | Jenkins et al. | 524/460 |
| 6,706,356 B2 | * | 3/2004 | Lee | 428/40.1 |

(Continued)

FOREIGN PATENT DOCUMENTS

EP 0814140 A2 12/1997
JP 58-61160 A 4/1983

(Continued)

OTHER PUBLICATIONS

Machine translation of JP 2007-39607 (Feb. 15, 2007).*

(Continued)

*Primary Examiner* — Vu A Nguyen
(74) *Attorney, Agent, or Firm* — McDermott Will & Emery LLP

(57) ABSTRACT

An aqueous dispersion-type acrylic pressure-sensitive adhesive composition includes acrylic copolymer emulsion particles dispersed in an aqueous medium. The acrylic copolymer emulsion particles has a ratio $(AN_{IN})/(AN_{SUR})$ of 1 or more, wherein $(AN_{IN})$ is an amount of acid groups in the acrylic copolymer emulsion particles, and $(AN_{SUR})$ is an amount of acid groups on the surfaces of the acrylic copolymer emulsion particles, $(AN_{IN})$ and $(AN_{SUR})$ being calculated from a titration curve of potentiometric titration performed by adding an inorganic base solution to an acidic sample dispersion solution containing the acrylic copolymer emulsion particles dispersed in ion exchange water. A pressure-sensitive adhesive tape which strongly adheres to an adherend and has excellent removability can be formed using the aqueous dispersion-type acrylic pressure-sensitive adhesive composition.

17 Claims, 2 Drawing Sheets

U.S. PATENT DOCUMENTS 6,844,391 B1 * 1/2005 Iyer et al. .................. 524/515
2006/0024263 A1 2/2006 Van Es et al.

FOREIGN PATENT DOCUMENTS

| | | |
|---|---|---|
| JP | 8-209086 A | 8/1996 |
| JP | 2005-247929 A | 9/2005 |
| JP | 2005-248059 A | 9/2005 |
| JP | 2006-152051 A | 6/2006 |
| JP | 2006-265537 A | 10/2006 |
| JP | 2007-3454 A | 1/2007 |
| JP | 2007-39607 A | 2/2007 |
| JP | 2007-217594 A | 8/2007 |
| WO | 2009/031421 A1 | 3/2009 |

OTHER PUBLICATIONS

EP Application No. 09726059.0: Extended European Search Report, dated Dec. 20, 2011.

* cited by examiner

Base titration [mL]

Base titration [mL]

Acid titration [mL]

Acid titration [mL]

AQUEOUS DISPERSION TYPE ACRYLIC PRESSURE-SENSITIVE ADHESIVE COMPOSITION AND PRESSURE-SENSITIVE ADHESIVE TAPE

CROSS REFERENCE TO RELATED APPLICATIONS

The present application claims priority under 35 U.S.C. to International Application PCT/JP2009/053186 filed Feb. 23, 2009 and published as WO 2009/119220 A1. The PCT application claims priority to Japanese Patent Application Nos. 2008-086285 and 2008-300767 filed Mar. 28, 2008 and Nov. 26, 2008, respectively. All applications above are incorporated herein by reference.

TECHNICAL FIELD

The present invention relates to an aqueous dispersion-type acrylic pressure-sensitive adhesive composition containing acrylic copolymer emulsion particles dispersed in an aqueous medium, and to a pressure-sensitive adhesive tape including the adhesive composition in a pressure-sensitive adhesive layer.

BACKGROUND OF THE INVENTION

As bonding means with high workability and high adhesion reliability, pressure-sensitive adhesive tapes are used for application of fixing parts and application of labels that indicate product information in the various industrial fields of OA equipment, home electric appliances, automobiles, and the like. On the other hand, from the viewpoint of protection of the global environment, assembly products such as OA equipment are increasingly disassembled after use, recycled, and reused. In this case, when parts are bonded together with pressure-sensitive adhesive tapes or labels are attached to parts, the work of removing the adhesive tapes or labels is required, and the property (so-called removability) of being capable of being removed without leaving adhesive residue or breaking support base materials is required. Further, in recent years, the suppression of emission of volatile organic compounds (so-called VOC) has been strongly demanded. For the pressure-sensitive adhesive tapes, solventless-type pressure-sensitive adhesives have attracted attention, and substitution of solvent-type pressure-sensitive adhesives with aqueous dispersion-type pressure-sensitive adhesives has been demanded.

A pressure-sensitive adhesive double coated tape so far disclosed as a pressure-sensitive adhesive double coated tape having high adhesion reliability and removability includes a nonwoven fabric core having specified strength; and an acrylic pressure-sensitive adhesive composition containing, as a main component, an acrylic copolymer which is composed of (a) an alkyl(meth)acrylate having an alkyl group with 1 to 12 carbon atoms, (b) a nitrogen-containing vinyl monomer, and (c) a hydroxyl group-containing monomer or carboxyl group-containing monomer, which is reactive to a crosslinking agent, and (d) an isocyanate-based crosslinking agent (refer to Japanese Unexamined Patent Application Publication No. 8-209086). However, when the pressure-sensitive adhesive double coated tape of this technique is formed by an emulsion polymerization method, it is difficult to exhibit excellent removability.

Also, a pressure-sensitive adhesive sheet using an emulsion-type pressure-sensitive adhesive and having both adhesion reliability and removability is disclosed (refer to Japanese Unexamined Patent Application Publication No. 2006-265537). As means for imparting both adhesion reliability and removability, a technique for an acrylic pressure-sensitive adhesive composition is disclosed, in which acrylic acid and methacrylic acid are combined in a total amount of 1.5 to 2.5% by mass, the ratio by mass of methacrylic acid to acrylic acid being 0.5 to 2.0. However, when a pressure-sensitive adhesive double coated tape having higher adhesive strength is prepared, it is difficult to secure satisfactory removability.

In addition, with respect to an emulsion-type pressure-sensitive adhesive characterized by containing acrylic acid and methacrylic acid, a technique for an acrylic pressure-sensitive adhesive composition is disclosed, in which acrylic acid and methacrylic acid are combined at a ratio by weight of 1/1 to 1/5, the content of acrylic acid and methacrylic acid being 2 to 10% by weight (refer to Japanese Unexamined Patent Application Publication No. 2005-248059). However, the influence of combination of acrylic acid and methacrylic acid on removability is not described. In addition, when the acrylic pressure-sensitive adhesive disclosed in this patent document is used as a component, adhesive force greatly increases with time after attachment, and thus it is difficult to secure removability. In particular, there is a problem that adhesive force to a metal surface such as stainless steel or the like greatly increases.

Further, when an adhesive tape using an emulsion-type adhesive is used for fixing a high-air-permeability member such as an urethane foam, a nonwoven fabric, or the like, there occurs a problem that the pressure-sensitive adhesive double coated tape peels off from the high-air-permeability member in an environment of high humidity.

A problem to be solved by the invention is to provide an aqueous dispersion-type emulsion pressure-sensitive adhesive capable of forming a pressure-sensitive adhesive tape which strongly adheres to adherends, causes no excessive increase in adhesive force in long-term adhesion, and can be removed without using a special treatment such as heating or the like and without leaving adhesive residue or breaking a support base material.

Further, a problem is to provide an aqueous dispersion-type emulsion pressure-sensitive adhesive capable of forming a pressure-sensitive adhesive tape which is used for fixing high-air-permeability members such as an urethane foam, a nonwoven fabric, and the like, and which does not peel off even in an environment of high humidity and is thus excellent in water resistance.

SUMMARY OF THE INVENTION

According to the present invention, acrylic copolymer emulsion particles containing acid groups, particularly carboxyl groups, are used as an aqueous dispersion-type pressure-sensitive adhesive composition, the acid groups being present inside the particles as well as on the surfaces thereof so that an amount of the acid groups in the particles is equivalent to or more than that on the surfaces. The acrylic copolymer emulsion particles can secure cohesive force between the emulsion particles due to the acid groups present on the surfaces thereof and can improve cohesive force inside the emulsion particles due to the acid groups present in the particles. Therefore, it is possible to form a pressure-sensitive adhesive layer which does not easily peels off and which causes little adhesive residue when removed. If the pressure-sensitive adhesive layer has a portion with low cohesive force, adhesion of the adhesive to an adherend easily proceeds with time because the portion with low cohesive force has high mobility, and thus adhesive force is excessively increased during long-term adhesion, thereby causing difficulty in removal. A pressure-sensitive adhesive composition containing the acrylic copolymer emulsion configured as described above can decrease a portion with low cohesive force in a pressure-sensitive adhesive layer and thus can preferably suppress deterioration with time of removability.

In addition, the acrylic copolymer emulsion particles can easily suppress entrance of water into the pressure-sensitive adhesive layer by virtue of the cohesive force between the emulsion particles due to the acid groups that are present on the particle surface and the cohesive force in the emulsion particles due the acid groups that are present inside the particles. Further, the pressure-sensitive adhesive layer including the emulsion of the present invention can take, in the particles, hydrophilic acid groups which are apt to be oriented on the particle surfaces. Therefore, the surface of the pressure-sensitive adhesive layer is suppressed in hydrophilicity and improved in hydrophobicity, and thus moisture little collects on an interface between a high-air-permeability member and a pressure-sensitive adhesive tape, thereby improving water resistance.

The present invention provides an aqueous dispersion-type acrylic pressure-sensitive adhesive composition including acrylic copolymer emulsion particles dispersed in an aqueous medium.

The acrylic copolymer emulsion particles are composed of an acrylic copolymer emulsion in which when an acidic sample dispersion solution prepared using acrylic copolymer emulsion particles and ion exchange water at a ratio by mass of 3/100 is subjected to potentiometric titration by dropping an inorganic base solution to measure a titration curve (X axis: the amount of base added, Y axis: pH) having titration start point $P_0$, minimum point $P_1$ showing the minimum pH after the start of titration, and inflection point $P_2$ appearing after the minimum point $P_1$, a ratio $(AN_{IN})/AN_{SUR})$ of an amount of acid groups $(AN_{IN})$ in the acrylic copolymer emulsion to an amount of acid groups $(AN_{SUR})$ on the surfaces of the acrylic copolymer emulsion is 1 or more, $AN_{SUR}$ being calculated from the amount of base added between the points $P_1$ and $P_2$, $AN_{IN}$ being calculated by subtracting an acid group amount calculated from the amount of base added between the points $P_0$ and $P_2$ from the total amount of acid groups $(AN_{TOTAL})$ in the acidic sample dispersion solution. Also, the present invention provides a pressure-sensitive adhesive tape including a pressure-sensitive adhesive layer composed of the pressure-sensitive adhesive composition.

An aqueous dispersion-type pressure-sensitive adhesive composition of the present invention can provide a pressure-sensitive adhesive tape which can be significantly decreased in emission of volatile organic compounds (so-called VOC) and organic solvent odor, which strongly adheres to adherends such as metals, which is not excessively increased in adhesive force even after long-term adhesion, and which can be removed without using a special treatment such as heating or the like and without leaving adhesive residue or breaking a support base material.

Further, a pressure-sensitive adhesive tape composed of the aqueous dispersion-type acrylic pressure-sensitive adhesive composition of the present invention can exhibit excellent water resistance such that in application of fixing a high-air-permeability member such as an urethane foam, a nonwoven fabric, or the like, the tape does not peel off even in use in an environment of high humidity.

DETAILED DESCRIPTION OF THE INVENTION

Figure 1:
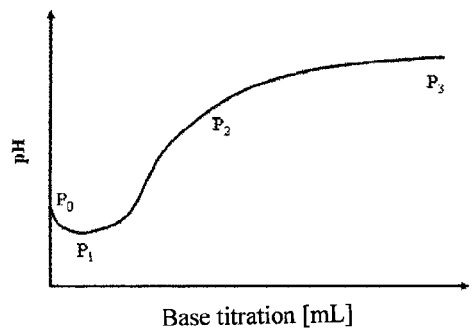
FIG. 1 is a conceptual diagram showing a titration curve obtained by potentiometric titration of an acrylic copolymer emulsion with a basic solution.

[Aqueous Dispersion-type Acrylic Pressure-sensitive Adhesive Composition]
(Distribution of Acid Groups)

Acrylic copolymer emulsion particles in an aqueous dispersion-type acrylic pressure-sensitive adhesive composition of the present invention are acrylic copolymer emulsion particles in which a ratio $(AN_{IN})/(AN_{SUR})$ of an amount of acid groups $(AN_{IN})$ in the acrylic copolymer emulsion particles to an amount of acid groups $(AN_{SUR})$ on the surfaces of the acrylic copolymer emulsion particles is 1 or more. In the present invention, the use of an acrylic copolymer having acid groups in an amount equivalent to or more than that of acid groups on the surfaces can decrease adhesive residue and suppress excessive increase in adhesive force with time, thereby realizing a pressure-sensitive adhesive tape having good removability. The aqueous dispersion-type acrylic pressure-sensitive adhesive composition using the acrylic copolymer emulsion particles can realize good removability even when formed in a pressure-sensitive adhesive tape having a pressure-sensitive adhesive layer with strong adhesive force. Therefore, a pressure-sensitive adhesive tape excellent in two contrary properties of strong adhesion and removability can be realized. Further, cohesive force can be secured by orientating the acid groups between the particles and inside the particles, and hydrophilicity on a surface of a pressure-sensitive adhesive layer can be decreased (hydrophobicity is improved) by suppressing the amount of acid groups on the particle surfaces. Therefore, a pressure-sensitive adhesive tape having excellent water resistance can be formed. The ratio $(AN_{IN})/(AN_{SUR})$ between the amounts of acid groups is preferably 1.3 or more, more preferably 1.5 or more, and most preferably 2.0 or more. The upper limit of the ratio is not particularly limited as long as the amount of surface acid groups $(AN_{SUR})$ is enough to secure cohesive force between the acrylic copolymer emulsion particles. However, the ratio is preferably 10 or less and more preferably 5 or less. Within the range to the upper limit, interaction between the particles is easily advanced, and cohesive force between the particles is easily enhanced, thereby improving removability and water resistance.

(Method for Measuring Acid Group Distribution)

A distribution of acid groups in the acrylic copolymer emulsion particles of the present invention is measured by the following method. The method for measuring a distribution of acid groups in the acrylic copolymer emulsion particles of the present invention preferably uses potentiometric titration because of little measurement error and a simple operation. The acid groups can be measured by potentiometric titration according to the method disclosed in Japanese Unexamined Patent Application Publication No. 2007-003454, and specifically measured by the method described below.

(Method for Measuring Acid Group Distribution Using Potentiometric Titration)

The method for measuring a distribution of acid groups in the acrylic copolymer emulsion particles using potentiometric titration in the present invention is described below.

An acidic sample dispersion solution used in potentiometric titration is prepared using the acrylic copolymer emulsion particles (solid content) and ion exchange water so that a ratio by mass represented by (acrylic copolymer emulsion/ion exchange water) is 3/100. The acrylic copolymer emulsion particles may be extracted from the aqueous dispersion-type acrylic pressure-sensitive adhesive composition in a state of being dispersed in an aqueous medium or being separated from the aqueous medium. The pH of the acidic sample dispersion solution is preferably 4 or less. When the acrylic copolymer emulsion particles are extracted, in a state of being dispersed in an aqueous medium, from the aqueous dispersion-type acrylic pressure-sensitive adhesive composition which is neutralized with ammonia water or the like, the pH of the sample dispersion solution is preferably adjusted to 4 or less by adding a weak acid such as formic acid, butyric acid, or the like according to demand.

The titration can be performed using an automatic potentiometric titrator. Examples of the automatic potentiometric titrator include AT-610 and AT-420N-WIN which are manufactured by Kyoto Electronics Co., Ltd.

Figure 2:
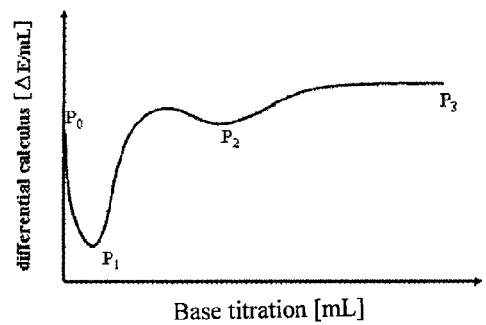
FIG. 2 is a conceptual diagram showing a differential curve based on a titration curve obtained by potentiometric titration of an acrylic copolymer emulsion with a basic solution.

The amount of acid groups ($AN_{SUR}$) on the surfaces of the acrylic copolymer emulsion particles and the amount of acid groups ($AN_{IN}$) inside the acrylic copolymer emulsion particles are calculated based on a titration curve formed by the potentiometric titration. When the potentiometric titration is performed while plotting the amount of base added on the X axis and pH on the Y axis, a titration curve (FIG. 1) is obtained, in which there are minimum point $P_1$ showing the minimum pH after the start of titration and inflection point $P_2$ appearing after the minimum point $P_1$ between titration start point $P_0$ and titration end point $P_3$. The minimum point $P_1$ and the inflection point $P_2$ are made easy to read by converting the titration curve into a differential curve (FIG. 2) in which the amount (mL) of base added is shown on the X axis, and $\Delta E/mL$ is shown on the Y axis.

In the titration curve, the region of $P_0$ to $P_1$ is a region in which a free acid in an aqueous phase of the sample dispersion solution is neutralized. The pH value decreases with neutralization of the free acid in the aqueous phase, and the minimum point $P_1$ showing the minimum pH value is shown at the time the acid is completely neutralized. Therefore, the amount of base added within this region corresponds to a titer required for neutralizing the acid in the aqueous phase. The amount of acid groups ($AN_{AQUA}$) [meq/g] in the aqueous phase of the sample dispersion solution is calculated from the base titer and the concentration of the base in the inorganic base solution used in titration.

Since the acid used in polymerization for the acrylic copolymer remains in the aqueous dispersion-type acrylic pressure-sensitive adhesive composition, when the acrylic copolymer emulsion particles are extracted in a state of being dispersed in the aqueous medium, the free acid is present in the aqueous phase of the sample dispersion solution. On the other hand, when only the acrylic copolymer emulsion particles are separated and dispersed in ion exchange water, $P_0=P_1$ may be established because the acid is theoretically absent from the aqueous phase.

After the acid in the aqueous phase is neutralized, the acid groups on the surfaces of the acrylic copolymer emulsion particles, which are easily neutralized, are then neutralized. This corresponds to the region of $P_1$ to $P_2$ of the titration curve. Therefore, the amount of base added within this region corresponds to a titer required for neutralizing the acid groups on the surfaces of the acrylic copolymer emulsion particles. The amount of acid groups ($AN_{SUR}$) [meq/g] on the surfaces of the acrylic copolymer emulsion particles is calculated from the base titer and the concentration of the base in the inorganic base solution used in titration.

After the acid groups on the surfaces of the acrylic copolymer emulsion particles are neutralized, neutralization of the acid groups which are in the acrylic copolymer emulsion particles and which are hard to neutralize is started. This appears as the inflection point $P_2$ in the titration curve. In the case of the stable emulsion particles, it is difficult or troublesome to titrimetrically measure the total amount of acid groups present in the emulsion particles, and thus the amount of acid groups ($AN_{IN}$) in the acrylic copolymer emulsion particles is preferably calculated from the results of calculation and the total amount of acid groups ($AN_{TOTAL}$) in the sample dispersion solution according to the following equation:

$$AN_{IN}=AN_{TOTAL}-(AN_{SUR}+AN_{AQUA})$$

As an inorganic base in the inorganic base solution used in the titration, potassium hydroxide or sodium hydroxide can be preferably used, and potassium hydroxide is particularly preferably used. The concentration of the inorganic base used in titration is preferably adjusted within a range of 0.1 to 2 mol/L.

As other titration conditions, the titration is preferably intermittent constant-speed titration which is performed with an intermittent time of 10 seconds, a maximum dropping amount of 20 mL, an injection amount at each injection of 0.16 mL/injection during intermittent injection, an injection rate of 5 seconds/mL, a data collection potential of 4 mL, and a titer of 0.16 mL at each time of pH detection.

A specific measurement method is described by an example. The aqueous dispersion-type acrylic pressure-sensitive adhesive composition containing 3 g of the acrylic polymer emulsion particles (solid content) is weighed and placed in a 300 mL polyethylene beaker using a dropping pippet. Then, ion exchange water is injected into the polyethylene beaker until the total amount of a test sample becomes 100 g, followed by stirring. Then, an electrode and a temperature compensated electrode are immersed in the sample. The tip of a titration nozzle is arranged to be higher than the liquid level and 2 cm separated from the electrodes so as to avoid a titrant from dropping on the electrodes. Under these conditions, automatic potentiometric titration is started under stirring. After the end of measurement, an amount meq/g is calculated from the titer at an equivalent point automatically printed in the resultant titration curve.

(Method for Measuring Total Amount of Acid Groups)

The total amount of acid groups ($AN_{TOTAL}$) in the acidic sample dispersion solution may be determined from the theoretical amount of acid groups which is calculated from the feed amount, or may be determined by a measurement method of potentiometric titration using an inorganic acid solution as described below. The method for measuring the total amount of acid groups ($AN_{TOTAL}$) in the acidic sample dispersion solution by potentiometric titration is described below.

A sample dispersion solution equivalent to the acidic sample dispersion solution described above is adjusted by adding potassium hydroxide up to pH 13 so that all acid groups including those in the particles are neutralized. When the dispersion solution of acrylic copolymer emulsion particles is converted to a basic sample dispersion solution of pH 13, all the acid groups inside the particles are brought out to the surfaces of the emulsion particles due to electrostatic interaction. Therefore, the acid groups on the surfaces of the acrylic copolymer emulsion particles and the acid groups inside the particles can be simultaneously titrated by back titration of the basic sample dispersion solution with an inorganic acid solution. Therefore, the total amount of acid groups in the sample dispersion solution can be calculated.

As an acid used in the titration, sulfuric acid can be preferably used at a concentration of 0.1 mol/L. As the potentiometric titrator, the same apparatus as the above can be preferably used.

Figure 3:
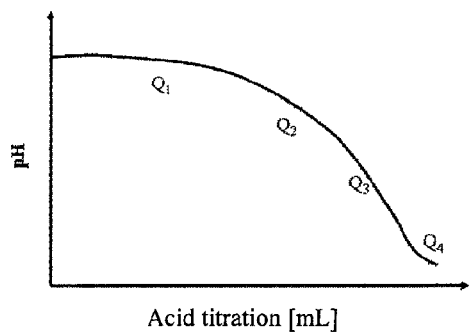
FIG. 3 is a conceptual diagram showing a titration curve obtained by potentiometric titration of an acrylic copolymer emulsion with an acid solution.
Figure 4:
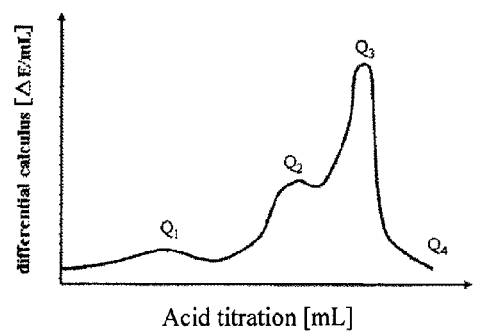
FIG. 4 is a conceptual diagram showing a differential curve based on a titration curve obtained by potentiometric titration of an acrylic copolymer emulsion with an acid solution.

When potentiometric titration is performed while plotting the amount of acid added on the X-axis and pH on the Y-axis, a titration curve is obtained, in which inflection points $Q_1$, $Q_2$, and $Q_3$ are present in the ascending order of acid titers between the titration start point $Q_0$ and end point $Q_4$ (FIG. 3). The inflection points are made easy to clearly read by converting into a differential titration curve (FIG. 4) in which the amount of acid added is shown on the X-axis, and $\Delta E/mL$ is shown on the Y-axis. The X coordinates at the inflection points $Q_1$, $Q_2$, and $Q_3$ are the dropping amounts of the acid at the respective points, and the amount of acid added between the points $Q_0$ and $Q_1$ is the titer required for neutralizing the residue of potassium hydroxide used for adjusting to pH 13. The amount of acid added between the points $Q_1$ and $Q_2$ is the titer required for neutralizing all acid groups present in the acrylic copolymer emulsion particles. The amount of acid added between the points $Q_2$ and $Q_3$ is the titer required for neutralizing the acid groups in the aqueous phase. Therefore, the total amount of acid groups ($AN_{TOTAL}$) in the acidic sample dispersion solution can be calculated by converting into meq/g based on the amount of acid added between the points $Q_1$ and $Q_3$ and the concentration of the acid used in the titration.

A specific measurement method is described by an example. The aqueous dispersion-type acrylic pressure-sensitive adhesive composition containing 3 g of the acrylic polymer emulsion particles (solid content) is weighed and placed in a 300 mL polyethylene beaker using a dropping pippet. Then, ion exchange water is injected into the polyethylene beaker until the total amount of a test sample is 100 g, followed by stirring. Then, 1N potassium hydroxide is added until the test sample becomes pH 13, followed by stirring. Then, an electrode and a temperature compensated electrode are immersed in the sample. Under the same titration conditions as described above, automatic potentiometric titration is started. After the end of measurement, the amount meq/g is calculated from the titer at an equivalent point automatically printed in the resultant titration curve.

The introduction of acid groups into the acrylic copolymer emulsion particles can be controlled by appropriately selecting a monomer composition and a polymerization method. With respect to the monomer composition, the acid groups can be introduced into the particles by enhancing the hydrophobicity of an acid monomer. Also, the acid groups can be introduced into the particles by copolymerizing a nitrogen-containing monomer having interaction with the acid groups. On the other hand, a dropping polymerization method is selected as the polymerization method so that the introduction of acid groups can be controlled by a method of dropping emulsified solutions having different compositions in the first half and the second half of dropping. Specifically, the ratio of acid monomers is high in the first half of dropping but is low in the second half of dropping so that acid monomers can be introduced into the particles.

(Acrylic Copolymer)

The acrylic copolymer used in the present invention is not particularly limited as long as the acrylic copolymer emulsion particles can be formed. However, an alkyl (meth)acrylate having an alkyl group with 1 to 12 carbon atoms can be preferably used as a main monomer component. ((Meth)acrylate having an alkyl group with 1 to 12 carbon atoms)

Examples of a (meth)acrylate having an alkyl group with 1 to 12 carbon atoms include monomer components such as methyl(meth)acrylate, ethyl(meth)acrylate, n-butyl(meth) acrylate, isobutyl(meth)acrylate, tert-butyl(meth)acrylate, n-octyl(meth)acrylate, isooctyl(meth)acrylate, 2-ethylhexyl (meth)acrylate, isononyl(meth)acrylate, cyclohexyl(meth) acrylate, and the like. At least one of these monomers is used.

In particular, at least one alkyl(meth)acrylate selected from 2-ethylhexyl(meth)acrylate, n-butyl(meth)acrylate, isobutyl (meth)acrylate, tert-butyl(meth)acrylate, isooctyl(meth) acrylate, and n-octyl(meth)acrylate or combination of two or more of these alkyl(meth)acrylates is preferably used. Further, combination of 2-ethylhexyl(meth)acrylate and n-butyl (meth)acrylate is particularly preferred. When the monomer components are used in combination, the total content is preferably 50% to 98% by mass. In addition, the ratio by mass of 2-ethylhexyl(meth)acrylate/n-butyl(meth)acrylate is preferably 9/1 to 2/8. Within this range, both removability and strong adhesion can be satisfied in a well-balanced manner.

(Vinyl Monomer Having Acid Group)

In the present invention, a monomer having an acid group is used for introducing acid groups on the surfaces of the acrylic copolymer emulsion and in the acrylic copolymer emulsion. As the monomer having an acid group, a vinyl monomer having a carboxyl group is preferably used. For the reason that cohesive force can be easily secured due to interaction between carboxyl groups, a large number of means can be used for increasing cohesive force because a carboxyl group is reactive with many crosslinking agents, and interaction with a nitrogen-containing vinyl monomer which will be described below can be exhibited, a vinyl monomer having a carboxyl group is preferably used.

The content of the vinyl monomer having a carboxyl group is preferably 0.5 to 10% by mass, more preferably 0.5 to 5% by mass, and most preferably 1 to 3.5% by mass. Within this range, crosslinking reaction with a crosslinking agent easily proceeds. Further, when a pressure-sensitive adhesive layer is formed, cohesive force desirable for the pressure-sensitive adhesive layer can be secured, and both removability and strong adhesion can be easily satisfied. In addition, cohesive force required for securing water resistance and hydrophobicity of the surface of the adhesive layer can be secured.

As the vinyl monomer having a carboxyl group, at least one selected from acrylic acid, methacrylic acid, itaconic acid, maleic acid, maleic anhydride, phthalic acid, phthalic anhydride, crotonic acid, and the like can be used. In particular, both acrylic acid and methacrylic acid are preferably used together. The ratio of methacrylic acid/acrylic acid is preferably 0.2 or more, more preferably 4 or more, and most preferably 6 or more, in terms of molar equivalent ratio.

In the present invention, methacrylic acid is preferably used because the acid groups can be easily introduced into the acrylic copolymer emulsion particles. In addition, acrylic acid and methacrylic acid are preferably combined for the purpose of improving strong adhesion, cohesive force between the particles, and particle dispersibility in the aqueous medium. When acrylic acid with relatively high hydrophilicity and methacrylic acid with higher hydrophobicity than acrylic acid are combined, acrylic acid tends to be oriented near the particle surfaces, and methacrylic acid tends to be oriented inside the particles. Therefore, the acid groups are easily oriented on the surfaces of the acrylic copolymer emulsion particles and inside the particles in a well-balanced manner.

(Nitrogen-containing Vinyl Monomer)

In the present invention, a nitrogen-containing vinyl monomer is preferably used in combination with the above-described monomer components. As the nitrogen-containing vinyl monomer, at least one selected from N-vinyl pyrrolidone, N-vinyl caprolactam, acryloyl morpholine, acrylonitrile, acrylamide, N,N-dimethyl acrylamide, and dimethylaminoethyl(meth)acrylate can be used.

In the present invention, the content of the nitrogen-containing vinyl monomer is adjusted within a range of 0.1 to 4.5% by mass, preferably 0.5 to 4% by mass, and more preferably 0.5 to 3.5% by mass, so that the advantages of the present invention can be preferably exhibited. It is supposed that the effect of bringing carboxyl groups, which are easily oriented on the surfaces of the particles, into the particles is created by interaction between the nitrogen-containing vinyl monomer and the acid groups, particularly carboxyl groups, in the acrylic copolymer emulsion particles. In order to create this effect, the content of the nitrogen-containing vinyl monomer is preferably the above-described lower limit or more. On the other hand, an increase in the content shows the tendency to decrease reactivity with a crosslinking agent described below. However, the necessary reactivity can be secured by adjusting the content to the above-described upper limit or less. At a content within this range, a distribution of the carboxyl groups in the acrylic copolymer emulsion particles is easily converged within the above-described range.

(Ratio of Nitrogen-containing Vinyl Monomer to Carboxyl Group-containing Vinyl Monomer)

The ratio of the nitrogen-containing vinyl monomer to the carboxyl group-containing vinyl monomer is not particularly limited but a molar ratio X/Y is preferably 1/1 to 1/20, more preferably 1/1 to 1/5, and most preferably 1/1 to 1/3, wherein X is the number of moles of the nitrogen-containing vinyl monomer, and Y is the number of moles of the carboxyl group-containing vinyl monomer among the monomer components which constitute the acrylic copolymer. Within this range, reaction of the carboxyl group-containing vinyl monomer with the crosslinking agent described below is suppressed. Further, a distribution of the carboxyl groups in the acrylic copolymer emulsion is easily converged within the above-described range.

(Other Monomer Components)

As the vinyl monomers used in the present invention, monomers other than the above may be used according to demand. Examples of such monomers that can be properly used include alcoholic hydroxyl group-containing monomers such as 2-hydroxyethyl(meth)acrylate, 2-hydroxypropyl(meth)acrylate, 2-hydroxybutyl(meth)acrylate, 4-hydroxybutyl(meth)acrylate, and the like. Examples of phosphate group-containing monomers include Sipomer PAM-100, PAM-200, PAM-300, and the like which are manufactured by Rhodia Inc. The phosphate group-containing monomer can be used at a ratio of 20% by mass or less of a total of 100% by mass of radically polymerizable unsaturated monomers, and at least one monomer can be used.

(Molecular Weight)

The weight-average molecular weight of the acrylic copolymer used in the present invention is preferably 500,000 to 1,200,000 and more preferably 60 to 1,000,000. Within this range, flexibility for impregnation of a nonwoven fabric with the pressure-sensitive adhesive and cohesive force necessary for removability can be satisfied in a well-balanced manner.

The weight-average molecular weight is determined in terms of standard polystyrene according to gel permeation chromatography (GPC). The measurement conditions include a TSK gel GMHXL column (manufactured by Tosoh Corporation), a column temperature of 40° C., tetrahydrofuran as an eluent, and a flow rate of 1.0 mL/min. TSK standard polystyrene is used as the standard polystyrene.

In order to adjust the molecular weight, a chain transfer agent may be used in polymerization. Examples of the chain transfer agent include known chain transfer agents such as lauryl mercaptan, glycidyl mercaptan, mercaptoacetic acid, 2-mercaptoethanol, thioglycolic acid, 2-ethylhexyl thioglycolate, 2,3-dimethylmercapto-1-propanol, and the like.

(Type of Tackifier)

In the present invention, a tackifier may be used for adjusting the adhesive force of the resulting pressure-sensitive adhesive layer. As the tackifier used in the present invention, an emulsion-type tackifier can be preferably used from the viewpoint of use for the aqueous dispersion-type pressure-sensitive adhesive composition. Examples of the emulsion-type tackifier include rosin, polymerized rosin, polymerized rosin esters, rosin phenol, stabilized rosin esters, disproportionated rosin esters, terpene, terpene phenol, petroleum resins, and the like.

Among these, a polymerized rosin ester tackifier and a rosin phenol tackifier are preferred, and combination thereof is particularly preferred. Specific examples of the polymerized rosin ester tackifier include Super Ester E-650 (manufactured by Arakawa Chemical Industries, Ltd.), Super Ester E-788 (manufactured by Arakawa Chemical Industries, Ltd.), Super Ester E-786-60 (manufactured by Arakawa Chemical Industries, Ltd.), Super Ester E-865 (manufactured by Arakawa Chemical Industries, Ltd.), Super Ester E-865NT (manufactured by Arakawa Chemical Industries, Ltd.), Hariester SK-508 (manufactured by Harima Chemicals, Inc.), Hariester SK-508H (manufactured by Harima Chemicals, Inc.), Hariester SK-816E (manufactured by Harima Chemicals, Inc.), Hariester SK-822E (manufactured by Harima Chemicals, Inc.), Hariester SK-323NS (manufactured by Harima Chemicals, Inc.), and the like. Specific examples of the rosin phenol tackifier include Tamanol E-100 (manufactured by Arakawa Chemical Industries, Ltd.), Tamanol E-200 (manufactured by Arakawa Chemical Industries, Ltd.), Tamanol E-200NT (manufactured by Arakawa Chemical Industries, Ltd.), and the like.

(Ratio of Tackifier)

When these tackifiers are combined, the ratio (A)/(B) by mass of the polymerized rosin ester tackifier (A) to the rosin phenol tackifier (B) is preferably 1/1 to 1/5, more preferably 1/1 to 1/4, and most preferably 1/1 to 1/3. Within this range, removability and adhesion reliability can be improved in a well-balanced manner.

(Softening Point of Tackifier)

The softening point of the tackifier is preferably 120° C. to 180° C. and more preferably 140° C. to 180° C. The adhesion reliability is improved by mixing the tackifier having a high softening point.

(Mixing Ratio of Acrylic Copolymer to Tackifier)

With respect to the mixing ratio of acrylic copolymer/tackifier, the ratio of acrylic copolymer/tackifier is preferably 100/10 to 100/40 and more preferably 100/15 to 100/35. Within this range, removability and adhesion reliability can be improved in a well balanced manner.

(Type of Crosslinking Agent)

In the present invention, the crosslinking agent is preferably used for improving the cohesive force of the resultant pressure-sensitive adhesive layer. Usable examples of the crosslinking agent include known isocyanates, epoxy compounds, aziridine compounds, polyvalent metal salts, metal chelates, keto-hydrazide compounds, oxazoline compounds, silane compounds, and glycidyl (alkoxy) epoxysilane compounds. Among these, a crosslinking agent of a type that advances crosslinking reaction by adding after the completion of polymerization is preferred. Examples of such a crosslinking agent include an isocyanate crosslinking agent, epoxy compounds, oxazoline compounds, glycidyl (alkoxy) epoxysilane compounds, and the like. Specific examples of the isocyanate crosslinking agent include Burnock DNW-5000 (manufactured by Dainippon Ink and Chemicals Inc.), Burnock DNW-5010 (manufactured by Dainippon Ink and Chemicals Inc.), Burnock DNW-5100 (manufactured by Dainippon Ink and Chemicals Inc.), Burnock DNW-5500 (manufactured by Dainippon Ink and Chemicals Inc.), Aquanate 100 (manufactured by Nippon Polyurethane Industry Co., Ltd.), Aquanate 105 (manufactured by Nippon Polyurethane Industry Co., Ltd.), Aquanate 110 (manufactured by Nippon Polyurethane Industry Co., Ltd.), Aquanate 120 (manufactured by Nippon Polyurethane Industry Co., Ltd.), Aquanate 130 (manufactured by Nippon Polyurethane Industry Co., Ltd.), Aquanate 200 (manufactured by Nippon Polyurethane Industry Co., Ltd.), Aquanate 210 (manufactured by Nippon Polyurethane Industry Co., Ltd.), LS2319 (manufactured by Sumika Bayer Urethane Co., Ltd.), LS2336 (manufactured by Sumika Bayer Urethane Co., Ltd.), Bayhydur 3100 (manufactured by Sumika Bayer Urethane Co., Ltd.), and the like. Specific examples of the epoxy compounds include Denacol EX-832 (manufactured by Nagase Chemical Co., Ltd.), Denacol EX-841 (manufactured by Nagase Chemical Co., Ltd.), Tetrad C (manufactured by Mitsubishi Gas Chemical Co., Ltd.), Tetrad X (manufactured by Mitsubishi Gas Chemical Co., Ltd.), and the like. Specific examples of the oxazoline compounds include Epocros WS-500 (manufactured by Nippon Shokubai Co., Ltd.), Epocros WS-700 (manufactured by Nippon Shokubai Co., Ltd.), Epocros K-2010E (manufactured by Nippon Shokubai Co., Ltd.), Epocros K-2020E (manufactured by Nippon Shokubai Co., Ltd.), Epocros K-2030E (manufactured by Nippon Shokubai Co., Ltd.), and the like. Specific examples of the glycidyl (alkoxy) epoxysilane compounds include 2-(3,4-epoxycyclohexylethyl trimethoxysilane (KBM-303; manufactured by Shin-Etsu Silicone Co., Ltd.), γ-glycidoxypropyl trimethoxysilane (KBM-403; manufactured by Shin-Etsu Silicone Co., Ltd.), γ-glycidoxypropylmethyl diethoxysilane (KBE-402; manufactured by Shin-Etsu Silicone Co., Ltd.), γ-glycidoxypropyl triethoxysilane (KBE-403; manufactured by Shin-Etsu Silicone Co., Ltd.), and the like. As an index for the degree of crosslinking, a gel fraction determined by measuring an insoluble content after the pressure-sensitive adhesive layer is immersed in toluene for 24 hours is used. The gel fraction is preferably 20 to 45% by mass and more preferably 25 to 38% by mass. Within this range, removability and strong adhesion can be secured in a well-balanced manner.

In particular, a crosslinking agent that reacts with the above-described vinyl monomers having acid groups is preferred, and the isocyanate crosslinking agent, the epoxy compounds, the oxazoline compounds, the glycidyl (alkoxy) epoxysilane compounds, and the like are preferred. The present invention relates to a technique characterized by securing cohesive force of the acrylic copolymer over the whole by orienting proper amounts of the acid groups both on the surfaces of the emulsion particles and inside the particles. The use of the crosslinking agent that reacts with the acid groups can preferably exhibit improvement in cohesive force.

(Additives)

If required, known additives such as a plasticizer, a softener, an antioxidant, a filler such as fibers made of glass or plastic, balloons, beads, metal powder, or the like, a coloring agent such as a pigment, a dye, or the like, a pH adjustor, a film formation auxiliary, a leveling agent, a thickener, a water repellent, an anti-foaming agent, and the like can be arbitrarily added to the pressure-sensitive adhesive composition within a range in which the advantages of the present invention are not inhibited.

(Production Method/Type of Emulsifier)

The aqueous dispersion-type acrylic pressure-sensitive adhesive composition of the present invention can be produced by an emulsion polymerization method for producing an emulsion-type pressure-sensitive adhesive. In emulsion polymerization, an anionic or nonionic emulsifier, and another dispersion stabilizer are used in proper amounts in order to secure polymerization stability. The emulsifier is not particularly limited, and a known emulsifier can be used. Examples of the anionic emulsifier include sodium lauryl sulfate, ammonium lauryl sulfate, sodium dodecylbenzenesulfonate, sodium polyoxyethylene alkyl ether sulfate, sodium polyoxyethylene alkyl phenyl ether sulfate, and the like. Examples of the nonionic emulsifier include polyoxyethylene alkyl ether, polyoxyethylene alkyl phenyl ether, and the like.

Further, it is preferred to use a known emulsifier having a polymerizable unsaturated group in its molecule, which is referred to as a "reactive emulsifier". Specific examples of such an emulsifier include Latemul S-180 (manufactured by Kao Co., Ltd.), Latemul PD-104 (manufactured by Kao Co., Ltd.), Aqualon HS-10 (manufactured by Daiichi Kogyo Seiyaku Co., Ltd.), Aqualon HS-20 (manufactured by Daiichi Kogyo Seiyaku Co., Ltd.), Aqualon KH-10 (manufactured by Daiichi Kogyo Seiyaku Co., Ltd.), Aqualon KH-1025 (manufactured by Daiichi Kogyo Seiyaku Co., Ltd.), Aqualon KH-05 (manufactured by Daiichi Kogyo Seiyaku Co., Ltd.), Aqualon RN-10 (manufactured by Daiichi Kogyo Seiyaku Co., Ltd.), Aqualon RN-20 (manufactured by Daiichi Kogyo Seiyaku Co., Ltd.), Aqualon ER-10 (manufactured by Daiichi Kogyo Seiyaku Co., Ltd.), Aqualon ER-20 (manufactured by Daiichi Kogyo Seiyaku Co., Ltd.), New Frontier A-229E (manufactured by Daiich Kogyo Seiyaku Co., Ltd.), Adeka Rea Soap SE-10 (manufactured by Asahi Denka Kogyo Co., Ltd.), Adeka Rea Soap SE-20 (manufactured by Asahi Denka Kogyo Co., Ltd.), Adeka Rea Soap SR-10N (manufactured by Asahi Denka Kogyo Co., Ltd.), Adeka Rea Soap SR-20N (manufactured by Asahi Denka Kogyo Co., Ltd.), and the like. The use of the reactive emulsifier is preferred because the water resistance of a film, as well as polymer stabilization, is improved.

As the emulsion polymerization method, a dropping polymerization method is preferably used. In order to facilitate the introduction of the acid groups in the particles, the dropping polymerization method is selected, in which emulsified solutions to be dropped in the first half and the second half of dropping have different compositions. Specifically, the acid monomers can be introduced into the particles by dropping the acid monomers at a high ratio in the first half and at a low ratio in the second half.

(Initiator)

The polymerization initiator used in emulsion polymerization is not particularly limited, and a known polymerization initiator can be used. Examples of the initiator include azo initiators such as 2,2',-azobis(2-methylpropionamidine)dihydrochloride, 2,2',-azobis(2-methylpropionamidine)disulfate, 2,2',-azobis(2-amidinopropane)dihydrochloride, 2,2',-azobis[N-(2-carboxyethyl)-2-methylpropionamidine]hydrate, 2,2',-azobis(N,N'-dimethyleneisobutylamidine)dihydrochloride, 2,2',-azobis[2-(2-imidazolin-2-yl)propane]dihydrochloride, and the like; persulfate initiators such as potassium persulfate, ammonium persulfate, sodium persulfate, and the like; peroxide initiators such as benzoyl peroxide, tert-butyl hydroperoxide, hydrogen peroxide, and the like; carbonyl initiators such as aromatic carbonyl compounds and the like; redox initiators such as a combination of persulfate and sodium hydrogen sulfite, a combination of peroxide and sodium ascorbate, and the like.

(Solid Content Concentration)

In addition, the solid content concentration of the aqueous dispersion-type acrylic pressure-sensitive adhesive composition of the present invention is not particularly limited but is preferably 40 to 70% by weight from the viewpoint of production cost and transport cost and the viewpoint of excellent drying properties in dry use.

(Aqueous Medium)

As the aqueous medium in the aqueous dispersion-type acrylic pressure-sensitive adhesive composition of the present invention, water may be used alone or a mixed solvent of water and a water-soluble solvent may be used. The term "a mixed solvent of water and a water-soluble solvent" that can be used in the present invention represents a mixed solvent substantially containing water as a main component and a water-soluble solvent. The content of the water-soluble solvent is preferably 10% by weight or less and more preferably 5% by weight or less based on the total amount of the mixed solvent. Examples of the water-soluble solvent include alcohols such as methyl alcohol, ethyl alcohol, isopropyl alcohol, ethyl carbitol, ethyl cellosolve, butyl cellosolve, and the like; a polar solvents such as N-methylpyrrolidone and the like. These solvents may be used alone or in combination of two or more.

(Average Particle Diameter)

The average particle diameter of the acrylic copolymer emulsion particles of the present invention is not particularly limited. However, since the introduction of acid groups in the emulsion particles may be difficult when the particle diameter is 150 nm or less, the particle diameter preferably exceeds 150 nm and is more preferably 200 to 800 nm, still more preferably 200 to 600 nm, and most preferably 250 to 400 nm. The term "average particle diameter" represents a volume based 50% median diameter of the emulsion particles and is based on a value obtained by dynamic light scattering measurement. When the average particle diameter is excessively small, the surface area of the particles is increased, thereby increasing the ratio of contact of the particle surfaces with water. As a result, for example, when carboxyl groups are used as the acid groups, the carboxyl groups are easily ionized to carboxylate anion, and thus the tendency of the carboxyl groups to localize on the surfaces of the particles is enhanced. Therefore, the ratio $(AN_{IN})/(AN_{SUR})$ of the acid group amount in the resultant acrylic copolymer emulsion to the acid group amount on the surfaces thereof may be difficult to fall within a desired range. Therefore, the average particle diameter preferably exceeds 150 nm. On the other hand, when the average particle diameter is excessively large, fusion between the emulsion particles after the pressure-sensitive adhesive layer is formed is promoted. Therefore, an excessively large average particle diameter is undesired, and the average particle diameter is preferably suppressed to 800 nm or less.

(Pressure-sensitive Adhesive Tape)

The pressure-sensitive adhesive tape of the present invention includes a pressure-sensitive adhesive layer composed of the aqueous dispersion-type acrylic pressure-sensitive adhesive composition. The pressure-sensitive adhesive layer may be a single layer or a multilayer including plural adhesive layers and sheets as in a pressure-sensitive adhesive double coated tape. The pressure-sensitive adhesive double coated tape can be preferably used for application of fixing two or more members.

(Pressure-sensitive Adhesive Layer)

The pressure-sensitive adhesive layer in the pressure-sensitive adhesive tape of the present invention is formed by removing the solvent from the aqueous dispersion-type acrylic pressure-sensitive adhesive composition. When the pressure-sensitive adhesive double coated tape is formed, the total thickness of the pressure-sensitive adhesive layers on the both sides is preferably 30 to 300 μm and more preferably 50 to 200 μm.

(Glass Transition Temperature)

The glass transition temperature (hereinafter referred to as "Tg") of the pressure-sensitive adhesive layer is preferably −25° C. or less and −5° C. or less. In particular, when Tg is in a range of −25° C. to −60° C., strong adhesive force can be preferably exhibited without impairing removability. Herein, Tg is a value determined from a temperature at which a convex peak value of a tangent loss is shown in a viscoelasticity spectrum.

(Strength of Nonwoven Fabric Base Material)

When the pressure-sensitive adhesive double coated tape is formed, a nonwoven fabric base material is preferably used as a core. In order to satisfy both removability and adhesion in a well-balanced manner, a nonwoven fabric having tensile strength, tearing strength, and interlayer strength within specified ranges is preferably used as the nonwoven fabric base material.

In both the D direction (longitudinal direction; running direction) and the TD direction (transverse direction; width direction), the tensile strength is 5 to 45 N/20 mm, preferably 10 to 45 N/20 mm, more preferably 15 to 40 N/20 mm, and most preferably 20 to 30 N/20 mm. In both the D direction (longitudinal direction; running direction) and the TD direction (transverse direction; width direction), the tearing strength is preferably 1 N or more. In both the D direction (longitudinal direction; running direction) and the TD direction (transverse direction; width direction), the interlayer strength is preferably 1 N/15 mm or more. When a nonwoven fabric having appropriate strength as shown in the above ranges is used, the phenomenon of breaking the nonwoven fabric or delaminating between layers during removal is easily suppressed. In addition, when the nonwoven fabric is allowed to hold proper flexibility, excellent adhesion is easily exhibited even in application which requires anti-repellency for permitting bending of the pressure-sensitive adhesive tape.

(Quality of Nonwoven Fabric Base Material)

As the nonwoven fabric base material, a known usual nonwoven fabric used as a nonwoven fabric base material of a pressure-sensitive adhesive tape can be used. Typical examples of the material include Manila hemp; pulp; chemical fibers such as rayon, acetate fibers, polyester fibers, polyvinyl alcohol fibers, polyamide fibers, and the like; and mixtures thereof. Further, if required, impregnation with viscose or impregnation treatment using a thermoplastic resin as a binder may be performed.

In particular, hemp alone or a mixed fabric of herm and vinylon, rayon, polyester, pulp, or the like is preferred. As the hemp, Manila hemp is preferred in view of strength. The content of Manila hemp is preferably 50% by mass or more and more preferably 70% by mass or more.

For the purpose of improving the strength of the nonwoven fabric base material, a known usual reinforcing agent is preferably added in the process for producing the nonwoven fabric base material. As the reinforcing agent, an internal reinforcing agent and an external reinforcing agent may be used alone or used together. As the internal reinforcing agent, a polyacrylamide resin, a urea-formaldehyde resin, a melamine-formaldehyde resin, an epoxy-polyamide resin, or the like can be used. In particular, a polyamideamine-epichlorohydrin resin that is an epoxy-polyamide resin is preferred because the interlayer strength of the nonwoven fabric base material is significantly increased. The amount of the internal reinforcing agent added is preferably 0.2 to 1%, more preferably 0.3 to 0.5%, based on the nonwoven fabric base material. As the external reinforcing agent, starch, or a thermoplastic resin such as viscose, carboxymethyl cellulose, polyvinyl-alcohol, polyacrylamide, or the like can be used. In particular, the internal reinforcing agent is preferably used in order to increase the interlayer strength of the nonwoven fabric base material.

(Basis Weight and Density of Nonwoven Fabric Base Material)

The basis weight of the nonwoven fabric base material is preferably 10 to 30 g/m$^2$, more preferably 13 to 25 g/m$^2$, and most preferably 14 to 20 g/m$^2$. The density is preferably 0.15 to 0.35 g/m$^2$ and more preferably 0.2 to 0.3 g/m$^2$. Within this range, the difficulty of breaking the nonwoven fabric base material and the ability of impregnating the nonwoven fabric base material with a pressure-sensitive adhesive can be improved in a well-balanced manner, and removability can be further improved.

(Method for Making Sheet of Nonwoven Fabric Base Material)

The method for making a sheet of the nonwoven fabric base material is not particularly limited, but various known wet methods may be used. In addition, various paper making methods using a cylinder paper machine, a short paper machine, a long paper machine, a Fourdrinier machine, a tilt short paper machine, and the like can be used. In particular, in order to make it difficult to break the nonwoven fabric base material, it is preferred to increase isotropy of strength and elongation in the MD and TD directions, and the tilt short paper machine is preferred because the isotropy is easily increased.

(Fixing of Acrylic Copolymer to Nonwoven Fabric Base Material)

In forming the pressure-sensitive adhesive double coated tape, it is preferred to fix the acrylic copolymer having a glass transition temperature (Tg) of $-10°$ C. or less to the nonwoven fabric base material. In comparison with a usual nonwoven fabric without an acrylic copolymer fixed thereto, fixing the acrylic copolymer improves chemical affinity to the acrylic pressure-sensitive adhesive composition because the surface of the nonwoven fabric is coated with the acrylic copolymer, thereby causing the function to enhance bonding between the nonwoven fabric base material and the pressure-sensitive adhesive. As a result, in a removal process of the pressure-sensitive adhesive tape attached to an adherend for a long time, the pressure-sensitive adhesive does not easily separate from the nonwoven fabric base material. In addition, when a nonwoven fabric is treated with an acrylic fiber processing agent, the tensile strength of the nonwoven fabric tends to be increased, but the tearing strength is greatly decreased, thereby making the fabric easy to tear. However, the use of the acrylic copolymer having a low glass transition temperature increases the tearing strength at a temperature near $-10°$ C. as a boundary, thereby greatly contributing to improvement in removability.

Further, the glass transition temperature of the acrylic copolymer fixed to the nonwoven fabric is necessarily $-10°$ C. or less, preferably $-15°$ C. or less, and more preferably $-20°$ C. or less. When the acrylic copolymer having a glass transition temperature of over $-10°$ C. is fixed to the nonwoven fabric base material, brittleness of the nonwoven fabric base material is increased, and tearing strength of the nonwoven fabric base material is decreased. As a result, the nonwoven fabric base material is easily significantly torn during removal. On the other hand, when the acrylic copolymer having a glass transition temperature of $-10°$ C. or less is fixed, the effect of relieving the stress applied to the nonwoven fabric base material in the removal process is created, thereby making the nonwoven fabric base material hard to tear.

(Production Process)

The pressure-sensitive adhesive layer is formed on the nonwoven fabric base material by a method of applying a pressure-sensitive adhesive solution directly to the nonwoven fabric base material using a roll coater, a die coater, or the like, or a method of forming the pressure-sensitive adhesive layer on a separator and then transferring the adhesive layer to the nonwoven fabric base material.

(Tensile Strength of Pressure-sensitive Adhesive Tape)

The tensile strength of the pressure-sensitive adhesive tape of the present invention is preferably 20 N/20 mm and more and less than 50 N/20 mm in both the MD direction (longitudinal direction: running direction) and the TD direction (transverse direction; width direction). The tensile strength is more preferably 20 N/20 mm and more and less than 40 N/20 mm and most preferably 30 N/20 mm and more and less than 40 N/20 mm. When the tensile strength is 20 N/20 mm or more, the pressure-sensitive adhesive tape becomes significantly hard to tear when being removed after adhesion for a long time. On the other hand, when the tensile strength is excessively high, the pressure-sensitive adhesive tape becomes so-called "firm", and thus the resistance to repulsive force is decreased, thereby easily causing peeling. Therefore, the tensile strength is preferably less than 50 N/20 mm. In particular, when the pressure-sensitive adhesive tape is used for application that requires the resistance to repulsive force, such as a curved surface or the like, the tensile strength is preferably less than 40 N/20 mm.

The tensile strength represents the maximum strength measured for a sample having a gauge line length of 100 mm and a width of 20 mm using a Tensilon tensile tester at a tension rate of 300 mm/min in an environment of 23° C. and 50% RH.

(180° Peel Adhesion of Pressure-sensitive Adhesive Tape)

The 180° peel adhesion of the pressure-sensitive adhesive tape is measured according to JIS-Z-0237 as follows. The adhesive tape is attached to a stainless steel plate used as an adherend by applying pressure through one reciprocation of a 2 kg roller in an environment of 23° C. and 50% RH and [A] allowed to stand for 1 hour in an environment of 23° C. and 50% RH to prepare a sample and [B] allowed to stand for 10 days in an environment of 60° C. and 0 to 5% RH and then allowed to stand for 1 hour in an environment of 23° C. and 50% RH to prepare a sample. In each of the pressure-sensitive adhesive tape samples [A] and [B], the pressure-sensitive adhesive tape is peeled at a rate of 1000 m/min in a direction at 180° to measure adhesion (samples [A] and [B]). The adhesion of the sample [A] is preferably 12 to 19 N/20 mm, and a difference ([A] and [B]) in adhesion is preferably less than 10 N/20 mm. When the adhesion is within this range, both removability and strong adhesion can be easily satisfied in a well-balanced manner. In the evaluation, the pressure-sensitive adhesive tape is cut into 20 mm width and 100 mm length to prepare a pressure-sensitive adhesive tape sample. In the case of the pressure-sensitive adhesive double coated tape, the pressure-sensitive adhesive double coated tape is backed with a PET film having a thickness of 25 μm and cut into 20 mm width and 100 mm length to prepare a double coated adhesive tape sample.

(Use)

The pressure-sensitive adhesive tape of the present invention is excellent in peeling resistance enough to resist the repulsive force of an adherend, retention enough to resist a load applied in a shearing direction, adhesion reliability under severe environmental conditions such as a high-humidity environment, and strong adhesion that permits stable fixing of parts, such as fixing of parts with a small area. In addition, the pressure-sensitive adhesive tape of the present invention has excellent removability when adhesion is improper in a work process or members are separated from each other for recycling. Further, unlike a conventional pressure-sensitive adhesive containing a solution polymerization-type acrylic resin as a main component, the effect of decreasing the emission of volatile organic compounds can be expected due to the use of the aqueous dispersion-type acrylic pressure-sensitive adhesive composition. Therefore, it is possible to preferably use as a pressure-sensitive adhesive tape for fixing parts in various products in industrial applications such as automobiles, building materials, OA, house electric appliances, and the like.

EXAMPLES

Next, the present invention is described in detail with reference to examples and comparative examples.
[Method for Preparing Aqueous Dispersion-type Pressure-sensitive Adhesive Composition]

Example 1

<Preparation of Emulsified Solution>

In a vessel, 75.00 g of ion exchange water, 20.00 g of surfactant Aqualon KH-1025 (manufactured by Daiichi Kogyo Seiyaku Co., Ltd.; active component 25%), and 37.50 g of surfactant Latemul PD-104 (manufactured by Kao Co., Ltd.; active component 20%) were placed and uniformly dissolved. Then, 227.5 g of n-butyl acrylate, 227.5 g of 2-ethylhexyl acrylate, 25.00 g of methyl methacrylate, 7.50 g of N-vinyl pyrrolidone, 12.50 g of acrylic acid (active component 80%), 3.13 g of methacrylic acid (active component 80%), and 0.20 g of lauryl mercaptan were added to the resultant solution. The resulting mixture was emulsified to produce 635.83 g of emulsified solution.

<Production of Acrylic Copolymer Emulsion>

In a reactor provided with a stirrer, a reflux condenser, a nitrogen inlet tube, a thermometer, and a dropping funnel, 290 g of ion exchange water was placed and heated to 60° C. while nitrogen was brown therein. Then, part (3.18 g) of the emulsified solution, 5.00 g of an aqueous ammonium persulfate solution (active component 3%), and 5 g of an aqueous sodium hydrogen sulfite solution (active component 3%) were added to the reactor under stirring, followed by polymerization for 1 hour at a temperature kept at 60° C. Then, 632.65 g of the remaining emulsified solution and 40 g of an aqueous ammonium persulfate solution (active component 1.25%) were added dropwise using another dropping funnel and polymerized over 8 hours while the reactor was kept at 60° C. After the completion of the addition, the mixture was stirred for 2 hours while the reactor was kept at 60° C., and then the contents were cooled to produce an acrylic copolymer emulsion (A). Then, the resultant emulsion (A) was adjusted to pH 7.0 with ammonia water (active component 10%). The emulsion was filtered with a 200 mesh wire net to produce an acrylic copolymer emulsion (B). The resultant water dispersion-type acrylic polymer had a solid content concentration of 52.6% and an average particle diameter of 323 nm.

<Production of Aqueous Dispersion-type Acrylic Pressure-sensitive Adhesive Composition>

To 950.57 g (dry: 500 g) of the acrylic copolymer emulsion (B), were added 2.5 g of Surfynol PSA-336 (manufactured by Air Products Japan Inc.; active component 100%) serving as a leveling agent, 2.5 g of Surfynol DF-110D (manufactured by Air Products Japan Inc.; active component 100%) serving as an antifoaming agent, 0.15 g of epoxy compound Tetrad C (manufactured by Mitsubishi Gas Chemical Co., Ltd.) serving as a crosslinking agent, 50 g (solid content) of emulsion-type polymerized rosin ester tackifier Super Ester E-865NT (manufactured by Arakawa Chemical Industries, Ltd.; softening point 160° C.) serving as a tackifier, and 50 g (solid content) of emulsion-type rosin phenol tackifier Tamanol E-200NT (manufactured by Arakawa Chemical Industries, Ltd.; softening point 150° C.). The resultant mixture was filtered with a 100 mesh wire net to prepare an aqueous dispersion-type acrylic pressure-sensitive adhesive composition of the present invention.

Example 2

<Preparation of Emulsified Solution>

An emulsified solution was prepared by the same method as in Example 1 except that 12.50 g of acrylic acid (active component 80%) and 3.13 g of methacrylic acid (active component 80%) were changed to 9.38 g and 6.25 g, respectively.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 302 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resulting acrylic copolymer emulsion was used.

Example 3

<Preparation of Emulsified Solution>

An emulsified solution was prepared by the same method as in Example 1 except that 12.50 g of acrylic acid (active component 80%) and 3.13 g of methacrylic acid (active component 80%) were changed to 6.25 g and 9.38 g, respectively.

<Production of Acrylic Copolymer Emulsion>

An acrylic copolymer emulsion was prepared by the same method as in Example 1 except that the above-described resulting emulsified solution was used. The resulting acrylic copolymer emulsion had a solid content concentration of 52.6% and an average particle diameter of 300 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resulting acrylic copolymer emulsion was used.

Example 4

<Preparation of Emulsified Solution>

An emulsified solution was prepared by the same method as in Example 1 except that 12.50 g of acrylic acid (active component 80%) and 3.13 g of methacrylic acid (active component 80%) were changed to 3.13 g and 12.50 g, respectively.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 315 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resultant acrylic copolymer emulsion was used.

Example 5

<Preparation of Emulsified Solution>

An emulsified solution was prepared by the same method as in Example 1 except that 12.50 g of acrylic acid (active component 80%) and 3.13 g of methacrylic acid (active component 80%) were changed to 1.88 g and 13.75 g, respectively.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 341 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resultant acrylic copolymer emulsion was used.

Example 6

<Preparation of Emulsified Solution>

An emulsified solution was prepared by the same method as in Example 1 except that 12.50 g of acrylic acid (active component 80%) and 3.13 g of methacrylic acid (active component 80%) were changed to 0 g and 15.63 g, respectively.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 367 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resultant acrylic copolymer emulsion was used.

Example 7

<Preparation of Emulsified Solution>

In a vessel, 75.00 g of ion exchange water, 20.00 g of surfactant Aqualon KH-1025 (manufactured by Daiichi Kogyo Seiyaku Co., Ltd.; active component 25%), and 37.50 g of surfactant Latemul PD-104 (manufactured by Kao Co., Ltd.; active component 20%) were placed and uniformly dissolved. Then, 230.5 g of n-butyl acrylate, 230.5 g of 2-ethylhexyl acrylate, 25.00 g of methyl methacrylate, 1.50 g of N-vinyl pyrrolidone, 3.13 g of acrylic acid (active component 80%), 12.50 g of methacrylic acid (active component 80%), and 0.20 g of lauryl mercaptan were added to the resultant solution. The resulting mixture was emulsified to produce 635.83 g of emulsified solution.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 339 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resultant acrylic copolymer emulsion was used.

Example 8

<Preparation of Emulsified Solution>

In a vessel, 75.00 g of ion exchange water, 20.00 g of surfactant Aqualon KH-1025 (manufactured by Daiichi Kogyo Seiyaku Co., Ltd.; active component 25%), and 37.50 g of surfactant Latemul PD-104 (manufactured by Kao Co., Ltd.; active component 20%) were placed and uniformly dissolved. Then, 231.25 g of n-butyl acrylate, 231.25 g of 2-ethylhexyl acrylate, 25.00 g of methyl methacrylate, 3.13 g of acrylic acid (active component 80%), 12.50 g of methacrylic acid (active component 80%), and 0.20 g of lauryl mercaptan were added to the resultant solution. The resulting mixture was emulsified to produce 635.83 g of emulsified solution.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 336 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resultant acrylic copolymer emulsion was used.

Comparative Example 1

<Preparation of Emulsified Solution>

In a vessel, 75.00 g of ion exchange water, 20.00 g of surfactant Aqualon KH-1025 (manufactured by Daiichi Kogyo Seiyaku Co., Ltd.; active component 25%), and 37.50 g of surfactant Latemul PD-104 (manufactured by Kao Co., Ltd.; active component 20%) were placed and uniformly dissolved. Then, 227.5 g of n-butyl acrylate, 227.5 g of 2-ethylhexyl acrylate, 25.00 g of methyl methacrylate, 7.50 g of N-vinyl pyrrolidone, 15.63 g of acrylic acid (active component 80%), and 0.20 g of lauryl mercaptan were added to the resultant solution. The resulting mixture was emulsified to produce 635.83 g of emulsified solution.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 338 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resultant acrylic copolymer emulsion was used.

Comparative Example 2

<Preparation of Emulsified Solution>

In a vessel, 75.00 g of ion exchange water, 20.00 g of surfactant Aqualon KH-1025 (manufactured by Daiichi Kogyo Seiyaku Co., Ltd.; active component 25%), and 37.50 g of surfactant Latemul PD-104 (manufactured by Kao Co., Ltd.; active component 25%) were placed and uniformly dissolved. Then, 231.25 g of n-butyl acrylate, 231.25 g of 2-ethylhexyl acrylate, 25.00 g of methyl methacrylate, 15.63 g of acrylic acid (active component 80%), and 0.20 g of lauryl mercaptan were added to the resultant solution. The resulting mixture was emulsified to produce 635.83 g of emulsified solution.

<Production of Acrylic Copolymer Emulsion>

An acrylic copolymer emulsion was prepared by the same method as in Example 1 except that the above-described resultant emulsified solution was used. The resultant acrylic copolymer emulsion had a solid content concentration of 52.6% and an average particle diameter of 358 nm.

<Production of Aqueous Dispersion-type Acrylic Pressure-sensitive Adhesive Composition>

An aqueous dispersion-type acrylic pressure-sensitive adhesive composition was prepared by the same method as in Example 1 except that the above-described resultant acrylic copolymer emulsion was used.

Comparative Example 3

<Preparation of Emulsified Solution>

In a vessel, 75.00 g of ion exchange water, 20.00 g of surfactant Aqualon KH-1025 (manufactured by Daiichi Kogyo Seiyaku Co., Ltd.; active component 25%), and 37.50 g of surfactant Latemul PD-104 (manufactured by Kao Co., Ltd.; active component 20%) were placed and uniformly dissolved. Then, 227.5 g of n-butyl acrylate, 227.5 g of 2-ethylhexyl acrylate, 25.00 g of methyl methacrylate, 7.50 g of N-vinyl pyrrolidone, 3.13 g of acrylic acid (active component 80%), 12.50 g of methacrylic acid (active component 80%), and 0.20 g of lauryl mercaptan were added to the resultant solution. The resulting mixture was emulsified to produce 635.83 g of emulsified solution.

<Production of Acrylic Copolymer Emulsion>

In a reactor provided with a stirrer, a reflux condenser, a nitrogen inlet tube, a thermometer, and a dropping funnel, 580 g of ion exchange water and 30.00 g of surfactant Aqualon KH-1025 (manufactured by Daiichi Kogyo Seiyaku Co., Ltd.; active component 25%) were placed and heated to 60° C. while nitrogen was brown therein. Then, part (19.07 g) of the emulsified solution, 5.00 g of an aqueous ammonium persulfate solution (active component 3%), and 5 g of an aqueous sodium hydrogen sulfite solution (active component 3%) were added to the reactor under stirring, followed by polymerization for 1 hour at a temperature kept at 60° C.

Then, 616.75 g of the remaining emulsified solution and 40 g of an aqueous ammonium persulfate solution (active component 1.25%) were added dropwise using another dropping funnel and polymerized over 8 hours while the reactor was kept at 60° C. After the completion of the addition, the mixture was stirred for 2 hours while the reactor was kept at 60° C., and then the contents were cooled to produce an acrylic copolymer emulsion (C). Then, the resultant emulsion (C) was adjusted to pH 7.0 with ammonia water (active component 10%). The emulsion was filtered with a 200 mesh wire net to produce an acrylic copolymer emulsion (D). The resultant water dispersion-type acrylic polymer had a solid content concentration of 40.2% and an average particle diameter of 112 nm.

<Production of Aqueous Dispersion-type Acrylic Pressure-sensitive Adhesive Composition>

To 1243.78 g (dry: 500 g) of the acrylic copolymer emulsion (D), were added 2.5 g of Surfynol PSA-336 (manufactured by Air Products Japan Inc.; active component 100%) serving as a leveling agent, 2.5 g of Surfynol DF-110D (manufactured by Air Products Japan Inc.; active component 100%) serving as an antifoaming agent, 0.15 g of epoxy compound Tetrad C (manufactured by Mitsubishi Gas Chemical Co., Ltd.) serving as a crosslinking agent, 50 g (solid content) of emulsion-type polymerized rosin ester tackifier Super Ester E-865NT (manufactured by Arakawa Chemical Industries, Ltd.; softening point 160° C.) serving as a tackifier, and 50 g (solid content) of emulsion-type rosin phenol tackifier Tamanol E-200NT (manufactured by Arakawa Chemical Industries, Ltd.; softening point 150° C.). The resultant mixture was filtered with a 100 mesh wire net to prepare an aqueous dispersion-type acrylic pressure-sensitive adhesive composition of the present invention.

[Method for Preparing Nonwoven Fabric Base Material]

A solution containing 90% of Manila hemp, 10% of polyester, and 0.5% of polyamideamine-epichlorohydrin resin was formed in a sheet by a tilt short paper machine so that the basis weight was 17 $g/m^2$ and the density was 0.28 $g/cm^2$, producing a nonwoven fabric base material having a tensile strength of 25.3 N/20 mm in the MD direction and 23.5 N/20 mm in the TD direction.

[Method for Preparing Pressure-sensitive Adhesive Double Coated Tape]

The aqueous dispersion-type acrylic pressure-sensitive adhesive composition was applied to a polyester film of 75 μm in thickness which was subjected to removal treatment so that the thickness after drying was 65 μm, and then dried at 100° C. for 5 minutes to produce a pressure-sensitive adhesive sheet. The resultant sheet was transferred to either surface of the nonwoven fabric base material and laminated thereon with a heat roll of 90° C. under pressure of 4 kgf/cm to produce a pressure-sensitive adhesive double coated tape. The resultant pressure-sensitive adhesive double coated tape was used in a test after aging at 40° C. for 2 days. The gel fraction of the pressure-sensitive adhesive double coated tape was as shown in Table 1.

[Evaluation Method (Aqueous Dispersion-type Acrylic Pressure-sensitive Adhesive Composition)]

(Method for Measuring Carboxyl Group Distribution in Acrylic Copolymer Emulsion)

In a 300 mL polyethylene beaker, 5.7 g (solid content 3g) of the acrylic copolymer emulsion (A) (solid content concentration 52.6%) prepared in Example 1 was weighed and placed using a dropping pippet. Then, 94.3 g of ion exchange water was injected into the polyethylene beaker, followed by stirring (the total weight of a test sample was 100 g). Then, an electrode and a temperature compensated electrode were immersed in the sample. The tip of a titration nozzle is arranged to be higher than the liquid level and 2 cm separated from the electrodes so as to avoid a titrant from being dropped on the electrodes. The method file was set so that the titration mode was intermittent constant-speed titration, the intermittent time was 10 seconds, the maximum adding amount was 20 mL, the injection amount at each injection was 0.16 mL/injection during intermittent injection, the injection rate was 5 seconds/mL, the data collection potential was 4 mL, and the data collection titer was 0.16 mL. Automatic potentiometric titration was performed under stirring. As a result of calculation from the resultant titration curve, the amount of acid groups present on the surfaces of the acrylic copolymer emulsion particles was 0.143 meq v/g, and the amount of acid groups present in the particles was 0.149 meq v/g.

Similarly, measurement was carried out for the acrylic copolymer emulsions of Examples 2 to 8 and Comparative Examples 1 to 4. The amount of acid groups present on the surfaces of the acrylic copolymer emulsion particles and the amount of acid groups present in the particles were calculated from each of the resultant titration curves. The results are shown in Table 1.

(Average Particle Diameter of Acrylic Copolymer Emulsion)

The average particle diameter (volume based 50% median diameter) was measured using Microtrac UPA particle size analyzer manufactured by Nikkiso Co., Ltd.

[Evaluation Method (Pressure-sensitive Adhesive Double Coated Tape)]

(Evaluation of Removability)

The pressure-sensitive adhesive double coated tape was backed with a PET film having a thickness of 25 μm and cut into 20 mm width and 100 mm length to prepare a double coated tape sample. The adhesive tape was attached to a stainless steel plate used as an adherend by applying pressure through one reciprocation of a 2 kg roller in an environment of 23° C. and 50% RH and allowed to stand for 10 days in an environment of 60° C. Then, the sample was allowed to stand for 1 hour in an environment of 23° C. and 50% RH. The pressure-sensitive adhesive tape was peeled at a rate of 25 m/min in a direction at 135° to measure removability. The removability was evaluated based on the following criteria:

◎: Adhesive residue on the adherend and an area of adhesive tape residue due to breakage of the nonwoven fabric were less than 3% of the adhesion area.

◎~○: Adhesive residue on the adherend and an area of adhesive tape residue due to breakage of the nonwoven fabric were 3% or more and less than 10% of the adhesion area.

○: Adhesive residue on the adherend and an area of adhesive tape residue due to breakage of the nonwoven fabric were 10% or more and less than 30% of the adhesion area.

Δ: Adhesive residue on the adherend and an area of adhesive tape residue due to breakage of the nonwoven fabric were 30% or more and less than 80% of the adhesion area.

×: Adhesive residue on the adherend and an area of adhesive tape residue due to breakage of the nonwoven fabric were 80% or more of the adhesion area.

(Evaluation of Strong Adhesion and Increase in Adhesive Force with Time After Adhesion to Adherend)

The pressure-sensitive adhesive double coated tape was backed with a PET film having a thickness of 25 μm and cut into 20 mm width and 100 mm length to prepare an adhesive double coated tape sample. The adhesive tape was attached to a stainless steel plate used as an adherend by applying pressure through one reciprocation of a 2 kg roller in an environment of 23° C. and 50% RH and [A] allowed to stand for 1 hour in an environment of 23° C. and 50% RH to prepare a sample and [B] allowed to stand for 10 days in an environment of 60° C. and 0 to 5% RH and then allowed to stand for 1 hour in an environment of 23° C. and 50% RH to prepare a sample. In each of the samples [A] and [B], the pressure-sensitive adhesive tape was peeled at a rate of 1000 m/min in a direction at 180° to measure adhesion (samples [A] and [B]). Then, an increase in adhesion ([B]-[A]) was calculated. The measurement of adhesion was carried out according to JIS-Z-0237.

(Evaluation of Water Resistance)

Figure 5:
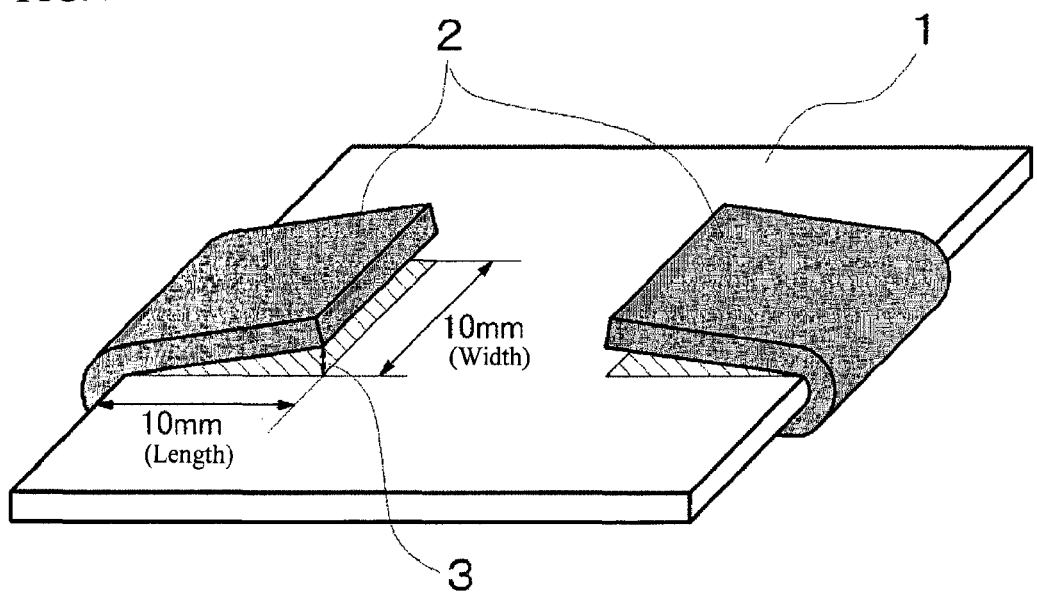
FIG. 5 is a schematic drawing showing a method for evaluating water resistance in examples of the present invention.

The pressure-sensitive adhesive double coated tape was attached to a ECS urethane foam (manufactured by Inoac Corporation; thickness 5 mm) by applying pressure through one reciprocation of a 2 kg roller in an environment of 23° C. and 50% RH and allowed to stand for 24 hours. Then, the tape was cut into samples having a width of 10 mm and attached to a stainless steel having a thickness of 2 mm so that the stainless steel was held between the samples with an adhesion length of 10 mm. Then, pressure was applied to the urethane foam surfaces through one reciprocation of a 2 kg roller and allowed to stand for 1 hour. Then, the samples were allowed to stand for 3 days in an environment of 60° C. and 90% RH to measure a peeling distance of the urethane foam from the adhesive double coated tape applied to the stainless steel (FIG. 5). The water resistance was evaluated on the basis of the following criteria:

TABLE 1

| | | Example 1 | Example 2 | Example 3 | Example 4 | Example 5 | Example 6 | Example 7 | Example 8 | Comp. Example 1 | Comp. Example 2 | Comp. Example 3 |
|---|---|---|---|---|---|---|---|---|---|---|---|---|
| Vinyl monomer having acid group | AA (% by mass) | 2.0 | 1.5 | 1.0 | 0.5 | 0.3 | 0 | 0.5 | 0.5 | 2.5 | 2.5 | 0.5 |
| | MAA (% by mass) | 0.5 | 1.0 | 1.5 | 2.0 | 2.2 | 2.5 | 2.0 | 2.0 | 0 | 0 | 2.0 |
| | MAA/AA equivalent ratio (eq/eq) | 0.2 | 0.6 | 1.3 | 3.4 | 6.1 | — | 3.4 | 3.4 | 0 | 0 | 3.4 |
| Nitrogen-containing vinyl monomer | NVP (% by mass) | 1.5 | 1.5 | 1.5 | 1.5 | 1.5 | 1.5 | 0.3 | 0 | 1.5 | 0 | 1.5 |
| Acid group distribution of acrylic copolymer | Amount of surface acid groups (meqv./g) | 0.143 | 0.140 | 0.130 | 0.117 | 0.097 | 0.083 | 0.124 | 0.140 | 0.173 | 0.230 | 0.208 |

TABLE 1-continued

|  |  | Example 1 | Example 2 | Example 3 | Example 4 | Example 5 | Example 6 | Example 7 | Example 8 | Comp. Example 1 | Comp. Example 2 | Comp. Example 3 |
|---|---|---|---|---|---|---|---|---|---|---|---|---|
| emulsion particles | Amount of inside acid groups (meqv./g) | 0.149 | 0.153 | 0.169 | 0.186 | 0.202 | 0.220 | 0.186 | 0.172 | 0.122 | 0.072 | 0.103 |
|  | Amount of inside acid groups/amount of surface acid groups | 1.04 | 1.09 | 1.30 | 1.59 | 2.08 | 2.65 | 1.50 | 1.23 | 0.71 | 0.31 | 0.50 |
| Average particle diameter (nm) |  | 323 | 302 | 300 | 315 | 341 | 367 | 339 | 336 | 338 | 326 | 112 |
| Gel fraction (%) |  | 43 | 36 | 37 | 38 | 34 | 36 | 39 | 44 | 43 | 42 | 41 |
| Evaluation of removability |  | ○ | ○ | ◎–○ | ◎–○ | ◎ | ◎ | ◎–○ | ○ | Δ | X | Δ |
| Adhesion (SUS) 1000 mm/min | After 23° C. × 1 hr (N/20 mm) | 17.0 | 16.0 | 16.0 | 16.0 | 16.0 | 15.0 | 15.5 | 15.5 | 16.0 | 15.5 | 15.5 |
|  | After 60° C. × 10 days (N/20 mm) | 28.0 | 26.5 | 25.0 | 24.0 | 22.0 | 20.5 | 24.0 | 26.5 | 32.0 | 34.0 | 30.0 |
|  | Increase in adhesion | 11.0 | 10.5 | 9.0 | 8.0 | 6.0 | 5.5 | 8.5 | 11.0 | 16.0 | 18.5 | 14.5 |
| Evaluation of water resistance |  | ○ | ○ | ◎ | ◎ | ◎ | ◎ | ◎ | ○ | X | XX | Δ |

◎: The urethane foam sufficiently adhered to the pressure-sensitive adhesive double coated tape and showed a peeling distance of less than 2 mm.
○: The urethane foam slightly separated from the pressure-sensitive adhesive double coated tape with no practical problem, and showed a peeling distance of less than 3 mm.
Δ: The urethane foam clearly separated from the pressure-sensitive adhesive double coated tape and showed a peeling distance of 3 mm or more.
X: The urethane foam completely separated from the pressure-sensitive adhesive double coated tape within 3 days after being allowed to stand in an environment of 60° C. and 90% RH.
XX: The urethane foam completely separated from the pressure-sensitive adhesive double coated tape within 1 day after being allowed to stand in an environment of 60° C. and 90% RH.

Table 1 indicates that the pressure-sensitive adhesive tapes using the aqueous dispersion-type acrylic pressure-sensitive adhesive compositions of Examples 1 to 8 of the present invention have excellent removability even with strong adhesive force of 10 N/20 mm or more. On the other hand, the pressure-sensitive adhesive tapes of Comparative Examples 1 to 3 have poor removability, and the pressure-sensitive adhesive tapes of Comparative Examples 1 and 3 show slightly more than 50% of tape residue and the pressure-sensitive adhesive tape of Comparative Example 2 shows 90% or more of tape residue. In addition, the pressure-sensitive adhesive tapes using the aqueous dispersion-type acrylic pressure-sensitive adhesive compositions of Examples 1 to 8 of the present invention have excellent adhesion even in an environment of high humidity.

The invention claimed is:

1. An aqueous dispersion-type acrylic pressure-sensitive adhesive composition comprising acrylic copolymer emulsion particles dispersed in an aqueous medium, wherein when an acidic sample dispersion solution prepared by dispersing the acrylic copolymer emulsion particles in ion exchange water is subjected to potentiometric titration by adding an inorganic base solution to measure a differential curve of a titration curve (X axis: the amount of base added, Y axis: pH) having titration start point $P_0$, minimum point $P_1$ showing the minimum pH after the start of titration, and inflection point $P_2$ appearing after the minimum point $P_1$, a ratio $(AN_{IN})/(AN_{SUR})$ of an amount of acid groups $(AN_{IN})$ in the acrylic copolymer emulsion particles to an amount of acid groups $(AN_{SUR})$ on the surfaces of the acrylic copolymer emulsion particles is 1 or more, $(AN_{SUR})$ being calculated from the amount of base added between the points $P_1$ and $P_2$, $(AN_{IN})$ being calculated by subtracting an acid group amount calculated from the amount of base added between the points $P_0$ and $P_2$ from the total amount of acid groups $(AN_{TOTAL})$ in the acidic sample dispersion solution.

2. The aqueous dispersion-type acrylic pressure-sensitive adhesive composition according to claim 1, wherein an acrylic copolymer constituting the acrylic copolymer emulsion particles contains a carboxyl group-containing vinyl monomer as a monomer component, and the carboxyl group-containing vinyl monomer is methacrylic acid.

3. The aqueous dispersion-type acrylic pressure-sensitive adhesive composition according to claim 1, wherein the particle diameter of the acrylic copolymer emulsion particles is 150 nm to 1000 nm.

4. The aqueous dispersion-type acrylic pressure-sensitive adhesive composition according to claim 2, wherein the acrylic copolymer constituting the acrylic copolymer emulsion particles contains acrylic acid as the carboxyl group-containing vinyl monomer, and the content ratio of methacrylic acid to acrylic acid which is represented by (methacrylic acid/acrylic acid) is 1.3 or more in terms of molar equivalent ratio.

5. The aqueous dispersion-type acrylic pressure-sensitive adhesive composition according to claim 1, wherein the acrylic copolymer constituting the acrylic copolymer emulsion particles contains a nitrogen-containing vinyl monomer.

6. The aqueous dispersion-type acrylic pressure-sensitive adhesive composition according to claim 5, wherein the content of the nitrogen-containing vinyl monomer in the acrylic copolymer constituting the acrylic copolymer emulsion particles is 0.1 to 4.5% by mass of the total amount of monomer components constituting the acrylic copolymer.

7. The aqueous dispersion-type acrylic pressure-sensitive adhesive composition according to claim 5, wherein when the number of moles of the nitrogen-containing vinyl monomer in the monomer components constituting the acrylic copolymer is X, and the number of moles of the carboxyl group-containing vinyl monomer is Y, a molar ratio X/Y is 1/1 to 1/20.

8. The aqueous dispersion-type acrylic pressure-sensitive adhesive composition according to claim 2, wherein the content of the carboxyl group-containing vinyl monomer in the acrylic copolymer constituting the acrylic copolymer emulsion particles is 0.5 to 10% by mass of the total amount of monomer components constituting the acrylic copolymer emulsion particles.

9. The aqueous dispersion-type acrylic pressure-sensitive adhesive composition according to claim 1, wherein the acrylic copolymer constituting the acrylic copolymer emulsion particles contains an alkyl (meth)acrylate having an alkyl group with 1 to 12 carbon atoms as a main monomer component.

10. The aqueous dispersion-type acrylic pressure-sensitive adhesive composition according to claim 1, wherein the acrylic copolymer constituting the acrylic copolymer emulsion particles contains 2-ethylhexyl acrylate and n-butyl acrylate as monomer components, the total content of 2-ethylhexyl acrylate and n-butyl acrylate is 50 to 98% by mass of the total amount of monomer components, and the content ratio represented by (2-ethylhexyl acrylate/n-butyl acrylate) is 9/1 to 2/8 in terms of ratio by mass.

11. A pressure-sensitive adhesive tape comprising a pressure-sensitive adhesive layer composed of the aqueous dispersion-type acrylic pressure-sensitive adhesive composition according to claim 1.

12. The pressure-sensitive adhesive tape according to claim 11, wherein 180° peel adhesion (FA1) at a peeling rate of 1000 mm/min is 12 to 19 N/20 mm, the peel adhesion being measured after pressure-bonding to a stainless steel plate by one reciprocation of a 2 kg roller in an environment of a temperature of 23° C. and a relative humidity of 50% RH and then allowing to stand for 1 hour.

13. The aqueous dispersion-type acrylic pressure-sensitive adhesive composition according to claim 2, wherein the particle diameter of the acrylic copolymer emulsion particles is 150 nm to 1000 nm.

14. The aqueous dispersion-type acrylic pressure-sensitive adhesive composition according to claim 2, wherein the acrylic copolymer constituting the acrylic copolymer emulsion particles contains a nitrogen-containing vinyl monomer.

15. The aqueous dispersion-type acrylic pressure-sensitive adhesive composition according to claim 2, wherein the acrylic copolymer constituting the acrylic copolymer emulsion particles contains an alkyl (meth)acrylate having an alkyl group with 1 to 12 carbon atoms as a main monomer component.

16. The aqueous dispersion-type acrylic pressure-sensitive adhesive composition according to claim 2, wherein the acrylic copolymer constituting the acrylic copolymer emulsion particles contains 2-ethylhexyl acrylate and n-butyl acrylate as monomer components, the total content of 2-ethylhexyl acrylate and n-butyl acrylate is 50 to 98% by mass of the total amount of monomer components, and the content ratio represented by (2-ethylhexyl acrylate/n-butyl acrylate) is 9/11 to 2/8 in terms of ratio by mass.

17. A pressure-sensitive adhesive tape comprising a pressure-sensitive adhesive layer composed of the aqueous dispersion-type acrylic pressure-sensitive adhesive composition according to claim 2.

* * * * *